United States Patent
Wu et al.

(10) Patent No.: US 10,729,068 B2
(45) Date of Patent: Aug. 4, 2020

(54) METHOD AND SYSTEM FOR AUTOMATICALLY CONTROLLING A POSITION OF A GROUND ENGAGING TOOL OF AN AGRICULTURAL IMPLEMENT RELATIVE TO A GROUND SURFACE

(71) Applicant: CNH Industrial America, LLC, New Holland, PA (US)

(72) Inventors: Duqiang Wu, Bolingbrook, IL (US); Aditya Singh, Westmont, IL (US); Navneet Gulati, Naperville, IL (US); Jason Fox, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 309 days.

(21) Appl. No.: 15/830,366

(22) Filed: Dec. 4, 2017

(65) Prior Publication Data

US 2019/0166762 A1    Jun. 6, 2019

(51) Int. Cl.
*A01D 41/14* (2006.01)
*A01B 63/111* (2006.01)
*A01B 79/00* (2006.01)

(52) U.S. Cl.
CPC .......... *A01D 41/141* (2013.01); *A01B 63/111* (2013.01); *A01B 79/005* (2013.01)

(58) Field of Classification Search
CPC .... A01D 41/141; A01B 63/111; A01B 79/005
See application file for complete search history.

(56) References Cited

U.S. PATENT DOCUMENTS

| | | | |
|---|---|---|---|
| 4,617,902 A | 10/1986 | Hirano et al. | |
| 5,229,699 A | 7/1993 | Chu et al. | |
| 5,355,305 A | 10/1994 | Seem et al. | |
| 5,493,798 A * | 2/1996 | Rocke | E02F 3/437 37/348 |
| 5,653,210 A | 8/1997 | Fischer et al. | |
| 6,127,793 A | 10/2000 | Kerner | |

(Continued)

FOREIGN PATENT DOCUMENTS

KR    2007/0043071    4/2007

OTHER PUBLICATIONS

Sahaj Saxena and Yogesh V. Hote Internal Model Control Based PID Tuning Using First-Order Filter Dated Jul. 24, 2017 (3 pages).

*Primary Examiner* — Adam R Mott
(74) *Attorney, Agent, or Firm* — Rebecca L. Henkel; Rickard K. DeMille (57) ABSTRACT

A method for automatically controlling a position of one or more ground engaging tools of an agricultural implement is relative to a ground surface may include monitoring a position signal indicative of a position of a ground engaging tool of the implement. The position signal may have an associated system delay time. The method also may include estimating an arrival time when the position of the ground engaging tool will be within a predetermined threshold of a target position based on the monitored position signal and the system delay time associated with the monitored position signal. The method may include adjusting the position of the ground engaging tool and terminating the adjustment of the ground engaging tool at a termination time determined based on the arrival time.

14 Claims, 9 Drawing Sheets

(56) References Cited

U.S. PATENT DOCUMENTS

| | | |
|---|---|---|
| 7,640,078 B2 | 12/2009 | Smirnov |
| 8,840,118 B1 | 9/2014 | Giovanardi et al. |
| 2007/0253308 A1 | 11/2007 | Van Rens |
| 2012/0186504 A1* | 7/2012 | Ryder .................. A01B 79/005 111/174 |
| 2014/0144233 A1 | 5/2014 | Kim et al. |
| 2015/0323912 A1 | 11/2015 | Shamsuzzoha |
| 2019/0032305 A1* | 1/2019 | Hageman .............. E02F 9/2029 |

* cited by examiner

METHOD AND SYSTEM FOR AUTOMATICALLY CONTROLLING A POSITION OF A GROUND ENGAGING TOOL OF AN AGRICULTURAL IMPLEMENT RELATIVE TO A GROUND SURFACE

FIELD OF THE INVENTION

The present subject matter relates generally to position control methods and systems for agricultural implements, and, more particularly, to a method and system for controlling the position of one or more ground engaging tools of an agricultural implement relative to a ground surface.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools configured to till the soil over which the implement travels. For example, the implement may include certain ground engaging tools, such as shanks, configured to penetrate the soil to a particular depth. In this respect, the ground engaging tools may be pivotally coupled to a frame of the implement. Tillage implements may also include additional ground engaging tools, such as harrows configured to level or otherwise flatten any windrows or ridges in the soil and/or baskets configured to reduce the number of clods in the soil and/or firm the soil over which the implement travels. The positions of the various ground engaging tools may be controlled using a control system, for example a proportional-integral ("PI") or proportional-integral-derivative ("PID") control system. The control system may maintain the positions of the ground engaging tools within respective thresholds of target positions with respect to the ground surface, e.g., ground penetration depths. Delays within the control system, however, may make the system poorly suited to respond to large changes in the target position. Such large changes may be caused, for example, by an operator selecting a new target position and/or uneven ground surfaces.

Accordingly, a method and related system for automatically controlling a position of one or more ground engaging tools of an agricultural implement relative to a ground surface would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically controlling a position of one or more ground engaging tools of an agricultural implement relative to a ground surface. The method may include monitoring a position signal indicative of a position of a ground engaging tool of the agricultural implement. The position signal may have a system delay time associated therewith. The method may include estimating an arrival time when the position of the ground engaging tool will be within a predetermined threshold of a target position based on the monitored position signal and the system delay time associated with the monitored position signal. The method may include adjusting the position of the ground engaging tool. The method may include terminating, with the one or more computing devices, the adjusting of the position of the ground engaging tool at a termination time, the termination time being based on the arrival time.

In another aspect, the present subject matter is directed to a position control system for controlling a position of one or more ground engaging tools of an agricultural implement. The system may include a support structure, a ground engaging tool coupled to the support structure, and a tool position sensor configured to generate position signals indicative of a position of the ground engaging tool. The system may include at least one controller communicatively coupled to the tool position sensor. The at least one controller may include a processor and associated memory, and the memory may store instructions that, when executed by the processor, configure the at least one controller to perform operations. The operations may include monitoring the position signals, and the position signals may have a system delay time associated therewith. The operations may include estimating an arrival time when the error signal will be within a predetermined threshold of a target position based on the monitored position signal and the system delay time associated with the monitored position signal. The operations may include adjusting the position of the ground engaging tool and terminate the adjusting of the position of the ground engaging tool at a termination time. The termination time may be determined based on the arrival time.

In another aspect, the present subject matter is directed to a method for automatically controlling a position of one or more ground engaging tools of an agricultural implement relative to a ground surface. The method may include monitoring a position signal indicative of a position of a ground engaging tool of the agricultural implement. The position signal may have a system delay time associated therewith. The method may include estimating an arrival time when the position of the ground engaging tool will be within a predetermined threshold of a target position based on the monitored position signal and the system delay time associated with the monitored position signal. The method may include adjusting the position of the ground engaging tool. The method may include determining if the position of the ground engaging tool will overshoot at least one of the target position or an upper bound of the predetermined threshold of the target position. The method may include, when it is determined that the position of the ground engaging tool will overshoot at least one of the target position or an upper bound of the predetermined threshold of the target position, terminating, with the one or more computing devices, the adjusting of the position of the ground engaging tool at a termination time, the termination time being based on the arrival time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A tillage implement, or other agricultural implement, may be moved across a field to perform an agricultural operation, such as a tilling operation. A control system associated with the implement may control the positions of various ground-engaging tools supported on the implement with respect to a ground surface over which the implement is moved. An operator may set desired operating parameters for the agricultural operations, for example, the penetration depths with respect to the ground surface of the various ground-engaging tools. In some embodiments, a delay associated with the control system may prevent the control system from adequately performing large adjustments in the positions of the ground engaging tools with respect to the ground surface and/or a frame of the implement. The large adjustments may be caused, for example, by the operator changing target positions for one or more of the ground-engaging tools and/or uneven ground surfaces.

In accordance with aspects of the present disclosure, a method for automatically controlling a position of a ground engaging tool of an implement relative to a ground surface is provided. The method may include monitoring a position signal indicative of a position of a ground engaging tool of the agricultural implement. The position signal may have a system delay time associated therewith. The method may include estimating an arrival time when the position of the ground engaging tool will be within a predetermined threshold of a target position based on the monitored position signal and the system delay time associated with the monitored position signal. The method may include adjusting the position of the ground engaging tool. The method may include terminating, with the one or more computing devices, the adjusting of the position of the ground engaging tool at a termination time, the termination time being based on the arrival time.

According to aspects of the present disclosure, terminating adjustment of the position of the ground engaging tool at the termination time may prevent the position of the ground engaging tool of overshooting the target position, which otherwise may be caused by the delay associated with the position signals. Additionally, this may allow the control system to be more suitably tuned to respond to large changes in the target position, as described in greater detail below.

Figure 1:
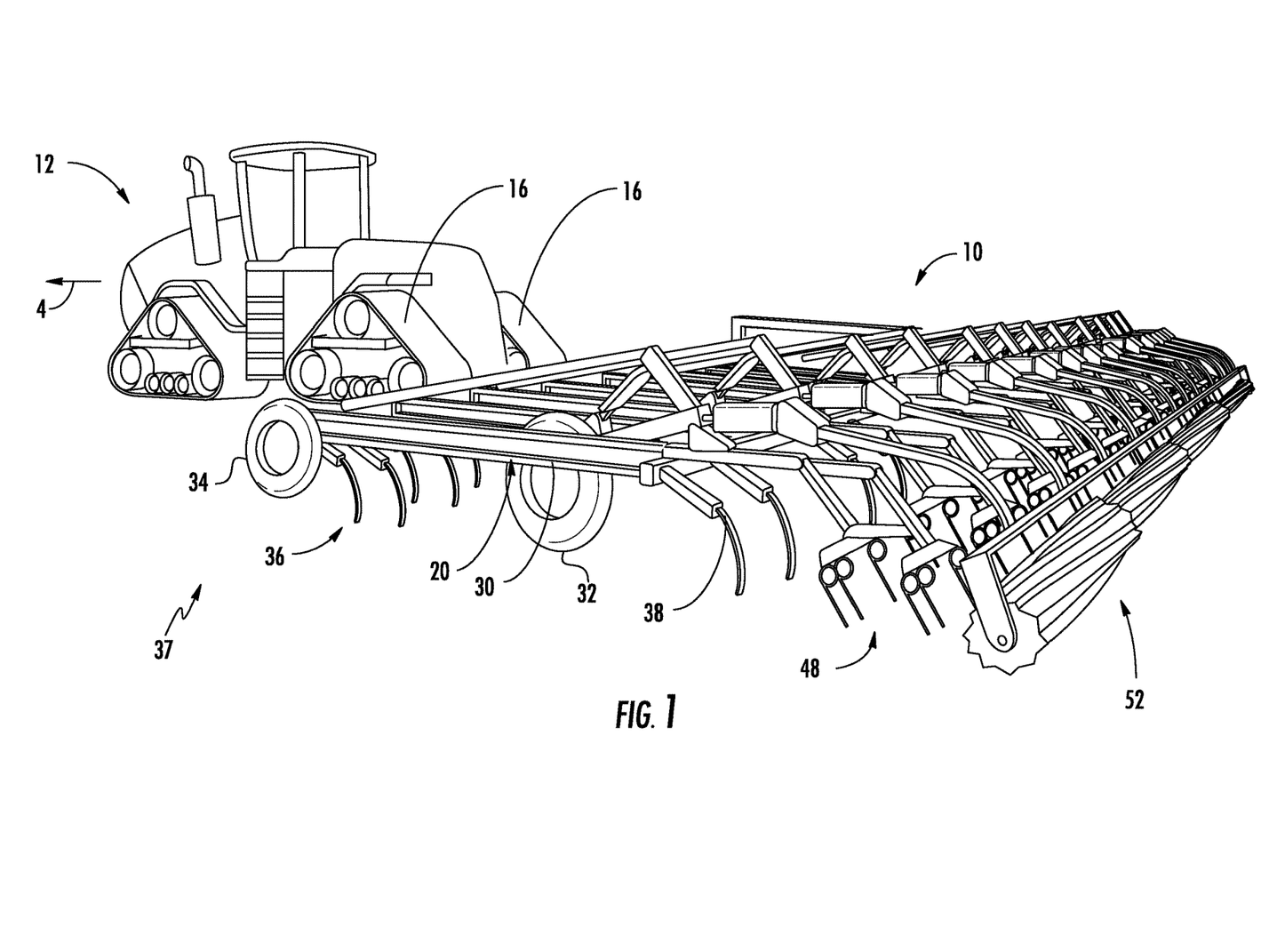
FIG. 1 illustrates a perspective view of one embodiment of an agricultural implement coupled to a work vehicle in accordance with aspects of the present subject matter.
Figure 2:
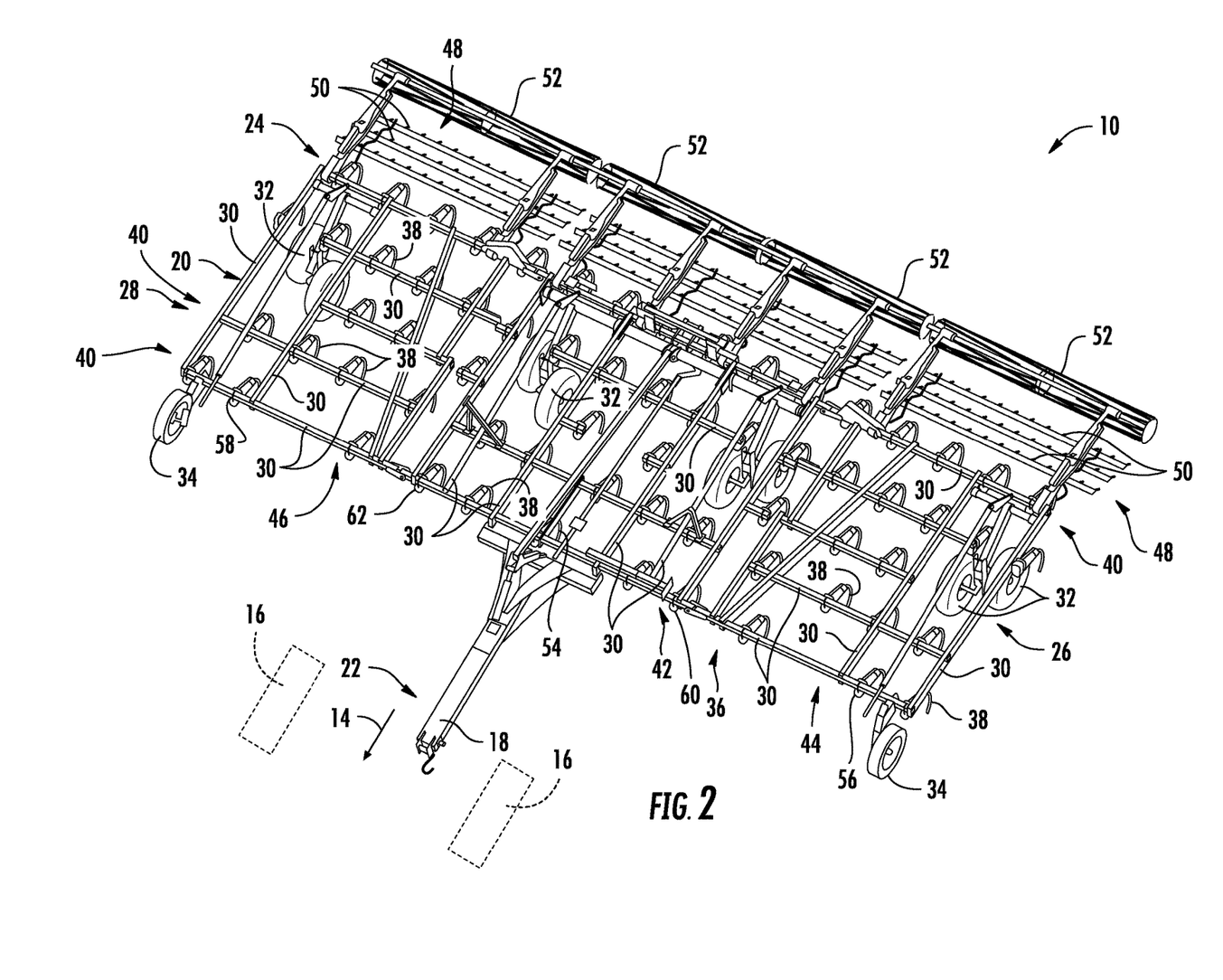
FIG. 2 illustrates an alternative perspective view of the agricultural implement shown in FIG. 1 in accordance with aspects of the present subject matter, particularly illustrating various ground engaging tools of the implement.

Referring now to the drawings, FIGS. 1 and 2 illustrate differing perspective views of one embodiment of an agricultural tillage implement 10 in accordance with aspects of the present subject matter. Specifically, FIG. 1 illustrates a perspective view of the tillage implement 10 coupled to a work vehicle 12. Additionally, FIG. 2 illustrates a perspective view of the tillage implement 10, particularly illustrating various components of the implement 10. Although described with reference to a tillage implement 10, it should be understood that the implement may be any suitable type of agricultural implement.

In general, the tillage implement 10 may be configured to be towed across a field along a direction of travel 14 by the work vehicle 12. As shown, the work vehicle 12 may be configured as an agricultural tractor having a plurality of track assemblies 16 for use in traversing the field. It should be appreciated, however, that the work vehicle 12 may be configured as any suitable work vehicle, such as a wheeled vehicle. The implement 10 may be coupled to the work vehicle 12 via a hitch assembly 18 or using any other suitable attachment means.

The tillage implement 10 may include an implement frame 20. As shown, the frame 20 may extend longitudinally between a forward end 22 and an aft end 24. The frame 20 may also extend laterally between a first side 26 and a second side 28. In this respect, the frame 20 may generally include a plurality of structural frame members 30, such as beams, bars, and/or the like, configured to support or couple to a plurality of ground engaging tools. Additionally, a plurality of wheels may be coupled to the frame 20, such as a set of centrally located wheels 32 and a set of front pivoting wheels 34, to facilitate towing the implement 10 in the direction of travel 14.

In one embodiment, the frame 20 may be configured to support a cultivator 36, which may be configured to till or otherwise break the soil of a ground surface 37 over which the implement 10 travels to create a seedbed. In this respect, the cultivator 36 may include a plurality of ground engaging tools 38 (e.g., shanks), which are pulled through the soil as the implement 10 moves across the field in the direction of travel 14. In some embodiments, the ground engaging tools 38 may be configured to be pivotally mounted to the frame 20 to allow the ground engaging tools 38 pivot out of the way of rocks or other impediments in the soil. As shown, the ground engaging tools 38 may be arranged into a plurality of ranks 40, which are spaced apart from one another longitudinally between the forward end 22 and the aft end 24 of the frame 20.

In several embodiments, the frame 20 may include one or more sections. As illustrated in FIG. 2, for example, the frame 20 may include a main section 42 positioned centrally between the first and second sides 26, 28 of the frame 20. The frame 20 may also include a first wing section 44 positioned proximate to the first side 26 of the frame 20. Similarly, the frame 20 may also include a second wing section 46 positioned proximate to the second side 28 of the frame 20. The first and second wing sections 44, 46 may be pivotally coupled to the main section 42 of the frame 20. In this respect, the first and second wing sections 44, 46 may be configured to fold up relative to the main section 42 to reduce the lateral width of the implement 10 to permit, for example, storage or transportation of the implement 10 on a road. In should be appreciated that the frame 20 may include any suitable number of wing sections.

Moreover, as shown in FIGS. 1 and 2, the implement 10 may also include one or more harrows 48. As is generally understood, the harrows 48 may be configured to be pivotally coupled to the frame 20. The harrows 48 may include a plurality of ground engaging tools 50, such as tines or spikes, which are configured to level or otherwise flatten any windrows or ridges in the soil created by the cultivator 36. Specifically, the ground engaging tools 50 may be configured to be pulled through the soil as the implement 10 moves across the field in the direction of travel 14. It should be appreciated that the implement 10 may include any suitable number of harrows 48. In fact, some embodiments of the implement 10 may not include any harrows 48.

Moreover, in one embodiment, the implement 10 may optionally include one or more additional ground engaging tools, such as one or more baskets or rotary firming wheels 52. As is generally understood, the baskets 52 may be configured to reduce the number of clods in the soil and/or firm the soil over which the implement 10 travels. As shown, each basket 52 may be configured to be pivotally coupled to one of the harrows 48. Alternately, the baskets 52 may be configured to be pivotally coupled to the frame 20 or any other suitable location of the implement 10. It should be appreciated that the implement 10 may include any suitable number of baskets 52. In fact, some embodiments of the implement 10 may not include any baskets 52.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of agricultural implement configuration.

Figure 3:
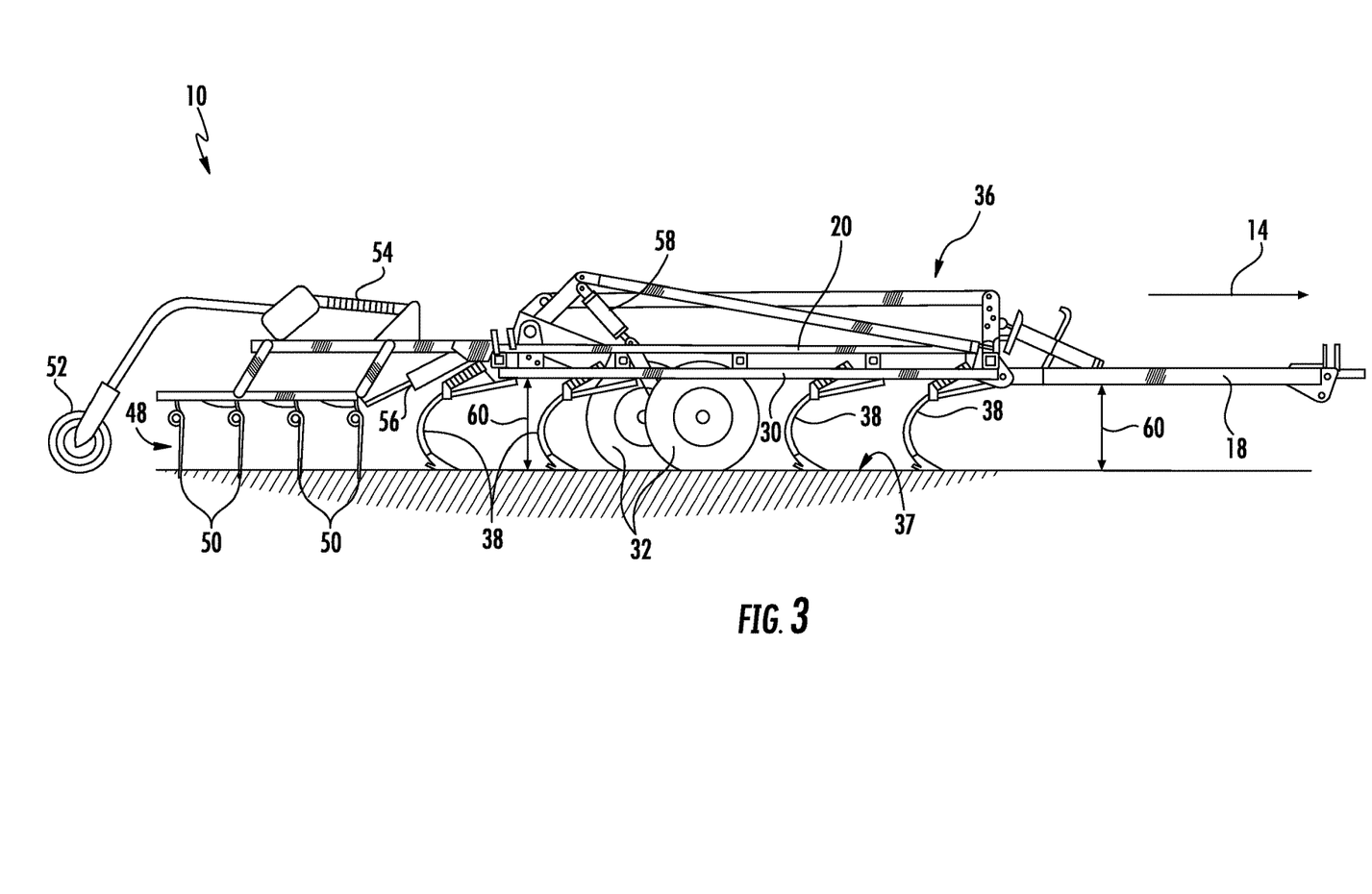
FIG. 3 illustrates a side elevation view of another embodiment of an agricultural implement in accordance with aspects of the present subject matter, particularly illustrating the various ground engaging tools of the implement positioned relative to the ground.

Referring now to FIG. 3, a side view of one embodiment of a tillage implement 10 is illustrated in accordance with aspects of the present subject matter. As shown, the implement 10 may include a plurality of actuators configured to adjust or and/or control the positions of the various ground engaging tools of the implement 10. For example, in some embodiments, at least one basket actuator 54 may be configured to adjust the position of the basket(s) 52 relative to the implement frame 20 to adjust a basket force between the basket(s) 52 and the ground surface 37. In some embodiments, at least one harrow actuator 56 may be configured to adjust the position of ground engaging tools 50 of the harrow(s) 48 relative to the implement frame 20 to adjust a harrow force between the ground engaging tools 50 and the ground surface 37 and/or a tool penetration depth. The tool penetration depth may be the depth below the ground surface 37 that the ground engaging tools 50 of the harrow(s) 48 extend respect to the ground surface 37 to level or otherwise flatten windrows or ridges in the soil. In some embodiments, at least one cultivator actuator 58 may be configured to adjust the position of the cultivator 36 relative to the implement frame 20 to adjust a cultivator force between the ground engaging tools 38 and the ground surface and/or a tool penetration depth of the ground engaging tools 38. In some embodiments, the plurality of actuators may be configured to raise and lower the implement frame 20 and/or cultivator 36 with respect to the ground surface 37 to adjust the penetration depths of the various ground engaging tools. For example, the plurality of actuators may be configured to adjust one or more local heights 60 of the implement frame 20 and/or cultivator 36 with respect to the ground surface 37.

Figure 4:
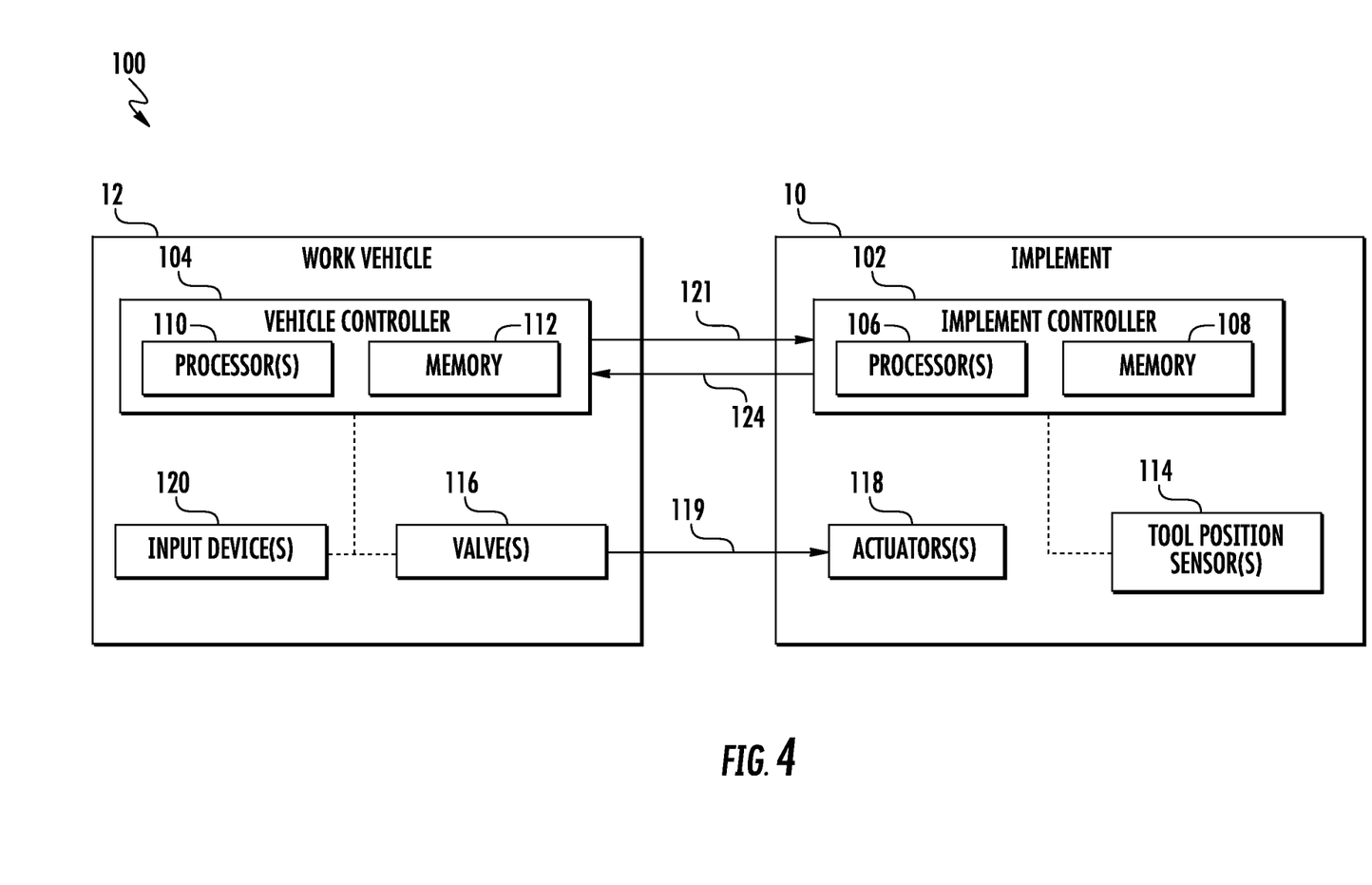
FIG. 4 illustrates a schematic view of one embodiment of a system for automatically controlling a position of one or more ground engaging tools of an agricultural implement relative to a ground surface in accordance with aspects of the present subject matter.

Referring to FIG. 4, a schematic view of one embodiment of a system 100 for automatically controlling a position of one or more ground engaging tools of an implement 10 relative to a ground surface 37 is illustrated in accordance with aspects of the present subject matter. The system 100 may include an implement controller 102 installed on and/or otherwise provided in operative association with the implement 10. In some embodiments, the system 100 may also include a vehicle controller 104 installed on and/or otherwise provided in operative association with the work vehicle 12. The implement controller 104 may be configured to electronically control the operation of one or more components of the implement 10, such as by electronically controlling the operation of one or more of the implement-based actuators to adjust the position(s) of the associated ground engaging tools of the implement. Similarly, the vehicle controller 104 may generally be configured to electronically control the operation of one or more components of the work vehicle 12.

In general, the implement controller 102 and vehicle controller 104 may correspond to any suitable processor-based device known in the art, such as a computing device or any suitable combination of computing devices. For example, the controllers 102, 104 may generally be configured as electronic control units (ECUs). Thus, in several embodiments, the implement controller 102 may include one or more processor(s) 106 and associated memory device(s) 108 configured to perform a variety of computer-implemented functions. Similarly, the vehicle controller 104 may also include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 108, 112 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 108, 112 may generally be configured to store suitable computer-readable instructions that, when implemented by the processor(s), configure the vehicle controller 104 and/or implement controller 102 to perform various computer-implemented functions, such as one or more aspects of the method 400 and/or algorithm 500 described below with reference to FIGS. 7 and 8. In addition, the vehicle controller 104 and/or implement controller 102 may also include various other suitable components, such as a communications circuit or module, one or more input/output channels, a data/control bus and/or the like.

In some embodiments, the system 100 may include at least one tool position sensor 114 configured to directly or indirectly detect the position of at least one of the ground engaging tools of the implement 10 relative to the ground surface 37. For example, in some embodiments, the tool position sensor(s) 114 may be communicatively connected with the implement controller 102. In some embodiments, the position sensor(s) 114 may include a basket position sensor(s), harrow position sensor(s), cultivator position sensor(s) and/or any other suitable tool tools position sensor(s) configured to sense the position of any ground engaging tools supported on the implement 110. For example, the tool position sensor(s) 114 may be configured to sense, for example, the distance that the respective ground engaging tools extend from the implement frame 20 and/or cultivator 36. The tool position sensor(s) 114 may also be configured to sense the distance(s) that the implement frame 20 and/or cultivator 36 are disposed above the ground surface 37 such that the positions of the ground engaging tools (e.g., ground penetration distances) may be indirectly sensed or calculated relative to the ground surface 37. In other embodiments, the tool position sensors 114 may be configured to sense the force exerted between the respective ground engaging tools and the ground surface 37. The implement controller 102 and/or vehicle controller 104 may then be configured to calculate penetration depths and/or relative positions of the various ground engaging tools with respect to the ground surface 37 based on the monitored force(s). Additionally, in some embodiments, the tool position sensor(s) 114 may include one or more inclinometers to sense fore/aft inclination angles of the implement frame 20 and/or cultivator 36, thereby providing an indication of the position(s) of one or more sets of the ground engaging tools. In other embodiments, tool position sensor(s) 114 may be configured to sense various local heights 60 of the implement frame 20 and/or cultivator 36 with respect to the ground surface 37 such that the fore/aft inclination angle(s) of the implement frame 20 and/or cultivator 36 may be calculated therefrom.

In some embodiments, the control system 100 may include one or more control valves 116 configured to regulate the supply of fluid (e.g., hydraulic fluid or air) to one or more of actuator(s) 118 configured to control the positions of the ground engaging tools of the implement 10. For example, in some embodiments, the vehicle controller 104 may be communicatively coupled with the valve(s) 116. The valve(s) 116 may be fluidly connected with the actuator(s) 118 through a plurality of hydraulic lines 119. Additionally, although the valve(s) 116 are illustrated and described as located on the work vehicle 12 (e.g., an ISOBUS Class 3 configuration), in other embodiments, the valve(s) may be located on the implement 10 (e.g., an ISOBUS Class 2 configuration). In such embodiments, the vehicle controller 104 may be communicatively coupled with the valves 116 through a communication connection (e.g., a hard-wired connection or wireless connection).

In other embodiments, the valve(s) 116 may be communicatively coupled with the implement controller 102, instead of the vehicle controller 12. In such embodiments, the implement controller 102 may transmit the position signals to the vehicle controller 104, and the vehicle controller 104 may transmit instructions to the implement controller 102 to control the positions of the ground engaging tools.

In some embodiments, the actuators 118 may include the basket actuator(s), harrow actuator(s), and/or the cultivator actuator(s), for example. Thus, in some embodiments, the system 100 may be configured to adjust ground forces and/or penetration depths associated with the various ground engaging tools connected with the implement 10. For example, the system 100 may be configured to adjust the harrow force, basket force, cultivator force, the tool penetration depth, and/or the like. In some embodiments, the control system 100 may be configured to control the actuators 118 based in part on signals received from the tool position sensor(s) 114, as explained in greater detail below.

Still referring to FIG. 4, in some embodiments, the vehicle controller 104 may be communicatively coupled with one or more input devices 120. The input device(s) 120 may include a keyboard and/or touchscreen, for example. An operator of the work vehicle 12 may input commands or other information using the input device(s) 120. For example, in some embodiments, the operator may input a desired operating parameter for an agricultural operation, such a tilling operation. For instance, the operator may input a target position (e.g., desired penetration depth and/or ground force) for one of more of the ground engaging tool associated with the implement 10.

In some embodiments, the vehicle controller 104 and the implement controller 102 may communicate with each other via any suitable communications protocol. Specifically, in one embodiment, an ISOBus Class 3 (ISO11783) interface may be utilized to provide a standard communications protocol between the controllers. Alternatively, a proprietary communications protocol may be utilized for communications between the work vehicle controller 104 and the implement controller 102. In some embodiments, the vehicle controller 104 and implement controller 102 may wirelessly communicate. For example, the controllers 102, 104 may include wireless communication interfaces configured to transmit and/or receive data via any suitable network, such as a local wireless network using any suitable wireless communications protocol (e.g., WiFi, Bluetooth, and/or the like) and/or a broader network, such as a wide-area network (WAN), using any suitable communications protocol (e.g., TCP/IP, HTTP, SMTP, FTP).

The vehicle controller 104 may transmit target position signals 121 (e.g., desired penetration depth and/or ground force) to the implement controller 102. In some embodiments, the implement controller 102 may receive position signals from the tool position sensor(s) 114 and transmit adjustment signals 124 to the vehicle controller 104. The adjustment signals 124 may instruct the vehicle controller 102 to adjust the position(s) of the ground engaging tool(s) using the valve(s) 116 to regulate the supply of fluid (e.g., hydraulic fluid or air) through the hydraulic lines 119 to the actuator(s) 118.

In some embodiments, a system delay time associated with the position signal may be the total delay time of the system. Various sources may contribute to the system delay time. For example, the transmissions of the adjustment signals 124 and/or the supply of fluid through the hydraulic line 119 may have associated delay times. In some embodiments, an adjustment signal delay time may be caused by a lag in the implement controller 102 transmitting the adjustment signals 124 to the vehicle controller 104, the vehicle controller 104 decoding the adjustment signals 124, the vehicle controller 104 reacting to the adjustment signals 124, and/or the like. Similarly, in some embodiments, a hydraulic delay time may be caused by a lag in the vehicle controller 104 controlling the valve(s) 116 and/or the flow of fluid through the hydraulic lines 119 to the actuators 118. Additionally, in some embodiments, communications delay between the controllers 102, 104 may be caused by disparate system refresh rates. The system delay time may also include a delay resulting from the momentum associated with the ground engaging tool and/or support structure. In other words, accelerating or decelerating the tool and/or support structure may effectively create a delay component or reduce the responsiveness of the system. In some implementations, the systems and methods disclosed herein may be used to counteract such a delay.

In some embodiments, the system delay time may be measured, for example, as part of a system calibration process. For example, in some embodiments, the delay time may be measured by inputting a command signal (e.g., a step command to change the position of the implement from a first position to a second position). The position signal may be compared with the command signal, for example, during a time interval in which the position of the implement is adjusted as a result of the command signal. This comparison may be used to determine the delay time. In some embodiments, the system calibration process may be performed manually (e.g., by an operator of the work vehicle 12). In other embodiments, the system calibration process may be performed automatically. For example, the control system 100 may be configured to automatically transmit the command signal and measure the delay time. In some embodiments, the control system 100 may be configured to automatically measure the delay time periodically (e.g., monthly, weekly, etc.).

In some embodiments, a single controller (e.g., the vehicle controller 104 or implement controller 102) may be configured to monitor the tool position sensors 114 and control the actuators 118 without using a second controller. The single controller could be located in any suitable location. Additionally, the methods disclosed herein may be implemented with one or more controllers that are separate from any existing vehicle controller(s) 104 or implement controller(s) 102. Thus, it should be understood that the system 100 described herein is merely illustrative. The methods disclosed herein may be implemented with any suitable system having a delay of any type.

The system 100 may have any suitable configuration. For example, in some embodiments, the tool position sensors 114 may be directly communicatively coupled with the vehicle controller 104. In such embodiments, a delay may still be associated with system 100. For example, the delay may be caused by internal processing, sensor lag, and/or the like. As indicated above, the methods and systems disclosed herein may provide improved control for systems having associated delays.

Figure 5A:
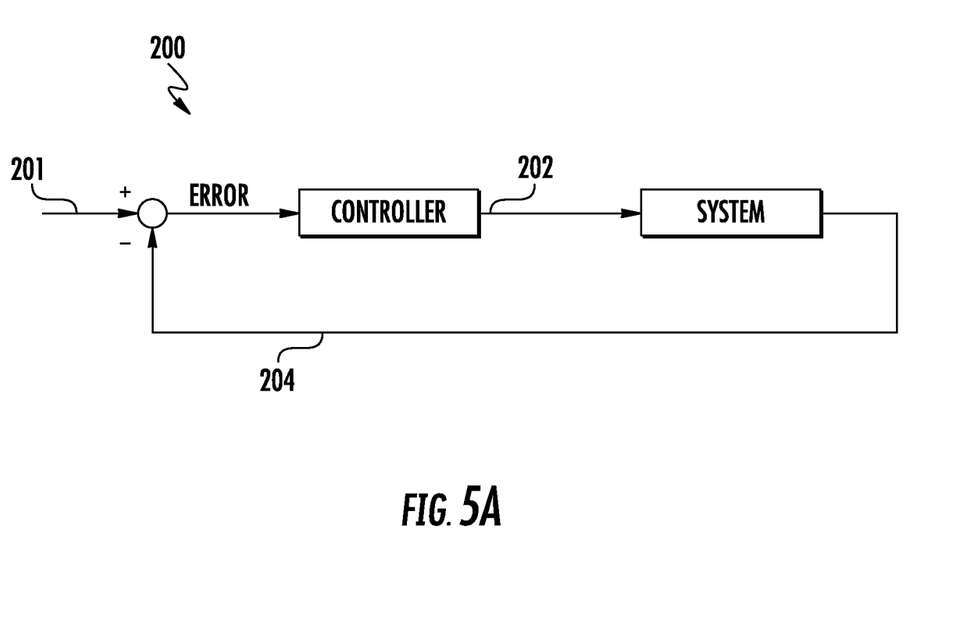
FIG. 5A illustrates a simplified schematic view of an example implementation of a method for automatically controlling a position of one or more ground engaging tools of an agricultural implement relative to a ground surface in accordance with aspects of the present disclosure.
Figure 5B:
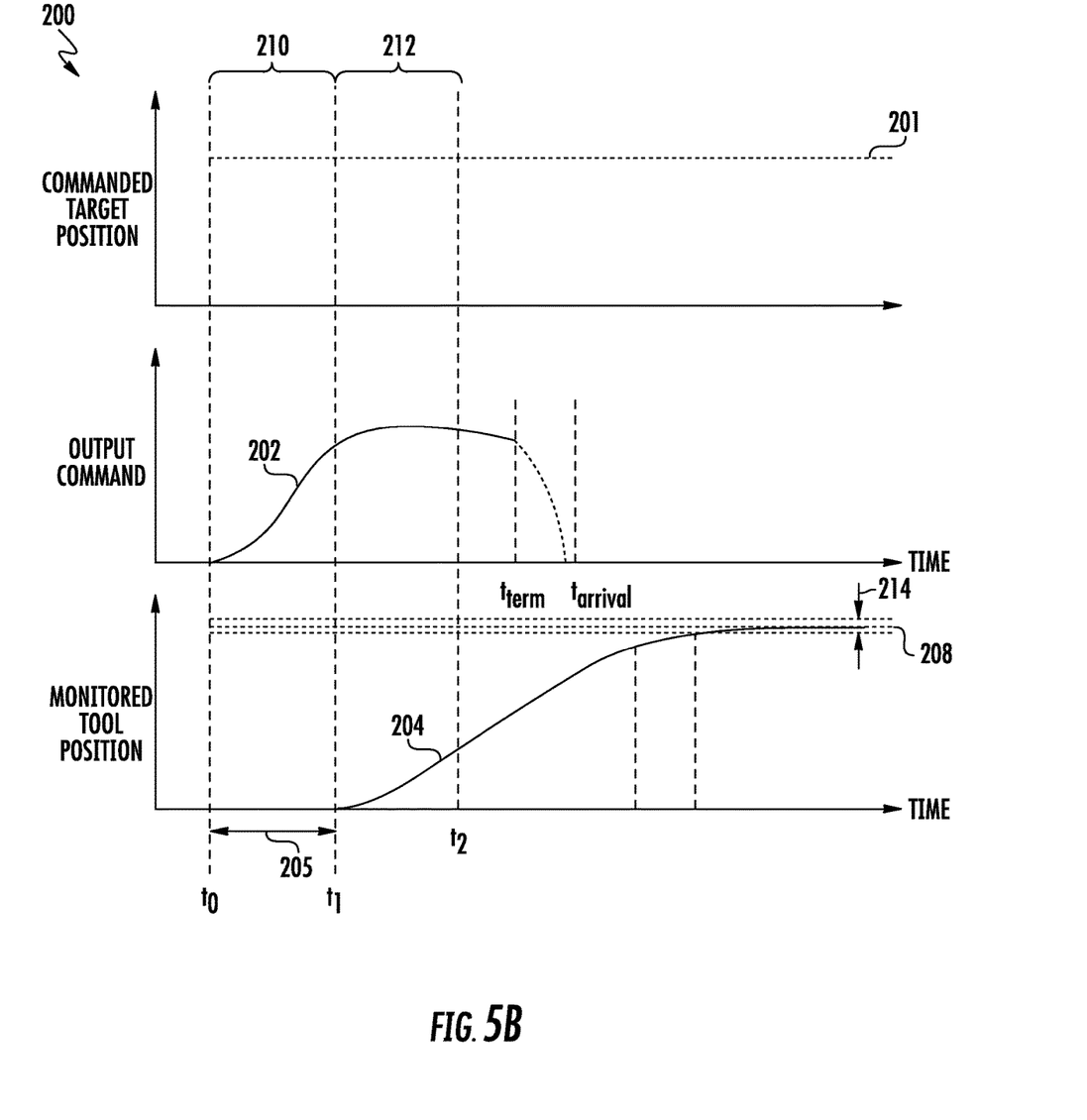
FIG. 5B illustrates sample plots of several parameters over time corresponding to the example implementation illustrated in FIG. 5A in accordance with aspects of the present disclosure.

FIGS. 5A and 5B illustrate an example implementation 200 of a method for automatically controlling a position of one or more ground engaging tools of an agricultural implement relative to a ground surface 37 in accordance with aspects of the present disclosure. FIG. 5A illustrates a simplified schematic view of the example implementation 200 in which a controller controls the operation of a system using a feedback loop. A commanded target position 201 is input, and an error signal is calculated. The controller generates the output command 202 based on the error signal, which may be calculated as the difference between the commanded target position 201 and a monitored tool position 204. The system adjusts the tool position based on the monitored tool position 202.

FIG. 5B plots these three variables against time on the horizontal axis. The top plot illustrates the commanded target position 201. The middle plot illustrates the output command 202 of the control system 100 (e.g., the adjustment signals 124 transmitted by the implement controller 102 to the vehicle controller 104). The bottom plot illustrates the monitored tool position 204 based on the corresponding position signals (e.g., received by the implement controller 102 from the tool position sensor(s) 114). The system delay time (illustrated by arrow 205) may exist between the output command 202 and the monitored tool position 204 as a result of at least one of a measurement delay and/or a response delay associated with the control system 100. At an initial time, $t_0$, the commanded target position 201 of the ground engaging tool may change from an initial value (zero in this example) to a new value (illustrated by dotted line 201 after $t_0$). The commanded target position 201 of the ground engaging tool may have an equivalent target position value 208, (illustrated on the bottom chart).

Over a first time period 210, the output command 202 may be adjusted such that the tool position is adjusted towards the target position. Because of the system delay time 205, however, the actual position of the implement may not change during the first time period 210 because of the response delay associated with the control system 100. Thus, the monitored tool position 204 may not show movement of the ground engaging tool during the first time period 210. At a first time, $t_1$, the ground engaging tool may be begin to move, and the monitored tool position 204 may begin to indicate such movement, as illustrated in the bottom chart by an increase in the monitored tool position 204. Over a second time period 212 (from $t_1$ to $t_2$), the control system 100 may estimate an arrival time (indicated by $t_{arrival}$) when the actual position of the ground engaging tool will be within a calculated predetermined threshold 214 of the target position value 208. In some embodiments, this estimation may be based on the monitored tool position 204 during the second period 212 and the associated system delay time 205. For example, in some embodiments, the control system 100 may assume that the once the command is given to stop moving the ground engaging tool, the system delay time 205 must pass before the ground engaging tool stops in response. In some embodiments, the control system 100 may calculate an average velocity of the ground engaging tool based on the rate of change of the monitored tool position 204 during the second time period 212. In some embodiments, the control system 100 may assume that the ground engaging tool has been moving at the average velocity since the initial time, $t_0$. In other embodiments, more complicated projection algorithms may be used, for example, based on experimental data, the response characteristics of the hydraulic system, and/or the like.

In some embodiments, the system 100 may calculate a termination time (indicated by $t_{term}$ in FIG. 5B). The system (for example the implement controller 102) may attempt to stop adjusting the position of the ground engaging tool at the termination time, $t_{term}$. For example, the control system 100 may attempt to stop the movement of the position of the ground engaging tool towards the target position before the ground engaging tool actually reaches the target position so that after the system delay time 205 passes and the control system 100 actually stops adjusting the position of the ground engaging tool, the position of the ground engaging tool may be within the predetermined threshold 214 of the target position value 208. This is illustrated by the dotted portion of line 202 in the middle plot dropping rapidly from $t_{term}$ to $t_{arrival}$. In some embodiments, the output command 202 may not drop instantaneously to zero at $t_{term}$ to prevent excessive acceleration or jerk. For example, the decrease in the output command 202 from $t_{term}$ to $t_{arrival}$ may be the result of any suitable control algorithm that accounts for the momentum of the tool. In other embodiments, however, the output command 202 may drop almost instantaneously to zero at $t_{term}$. For example, such a near instantaneous drop may be appropriate when the methods disclosed herein are implemented to control a parameter having small or no associated momentum (e.g., a force parameter).

Additionally, although illustrated as symmetric about the target position value 208, it should be understood that, in some embodiments, an asymmetric threshold region may be defined about the target position. For example, a first predetermined threshold may define a lower bound which is below (e.g., less than) the target position value 208, and a second predetermined threshold may define an upper bound which is above (e.g., greater than) the target position value 208. Additionally, the locations of the upper bound and lower bound may depend on whether the target position value 208 is greater than or less than the monitored tool position 204.

In some embodiments, the disclosed methods may be used to control the position of the ground engaging tools relative to the ground surface 37. For example, doing so may involve adjusting the position of the associated support structure, such as the implement frame 20 and/or cultivator 36, relative to the ground surface 37. For example, the actuators 118 may be used to adjust the local heights 60 and/or fore-aft angle of the implement frame 20 and/or cultivator 36. Thus, in some embodiments, adjusting the position of the ground engaging tools relative to the ground surface 37 may involve moving a relatively large mass, e.g., the implement frame 20 and/or cultivator 36. Accordingly, the mass associated with the tools and their corresponding support structure may be significant, in some embodiments. As a result, the momentum associated with the movement of the ground engaging tools may also be significant. In such embodiments, the termination time may be selected to compensate for the momentum of the associated support structure (e.g., the implement frame 20 and/or cultivator 36). In other embodiments, the termination time may not compensate for any momentum, and, accordingly, the termination time may equal the arrival time. This may be appropriate where the disclosed methods are used to control a tool ground force or down pressure, for example. In such an instance, compensating for the momentum of the ground engaging tool may not be appropriate.

Figure 6:
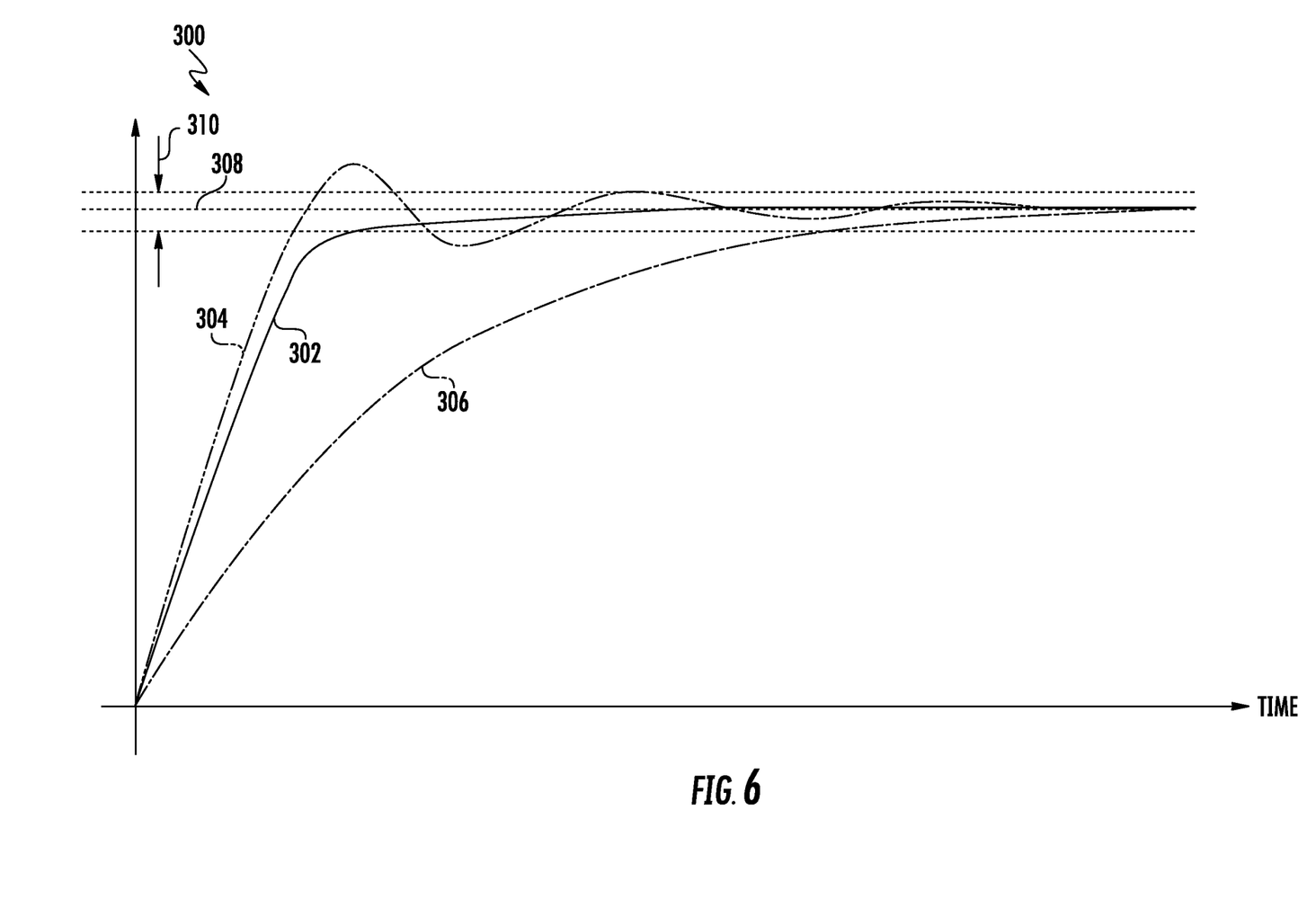
FIG. 6 illustrates a sample comparison between the position of ground engaging tool(s) controlled in accordance with aspects of the present disclosure and a conventional PID control system.

FIG. 6 illustrates a time-varying sample comparison 300 between the actual position 302 of a ground engaging tool controlled in accordance with aspects of the present disclosure and a conventional control system (e.g., a PID control system). For example, a conventional system PID control system may not be suited to accommodate large changes in the target position of the ground engaging tool when there is a system delay time, as discussed above. As a result, such a conventional control system may result in the actual position of the ground engaging tool overshooting (for example as illustrated by dotted line 304) or responding undesirably slowly (for example as illustrated by dotted line 306). A ground engaging tool controlled in accordance aspects of the present disclosure, however, may rapidly approach a target position 308 despite such a system delay time. At the termination time, $t_{term}$, the control system may stop actively adjusting the position of the ground engaging tool to prevent overshoot despite the delay associated with the system. In some embodiments, the termination time may be before the arrival time to compensate for the momentum of the ground engaging tool and/or support structure. Such momentum may carry the ground engaging tool within the predetermined threshold 310 of the target position 308.

Figure 7:
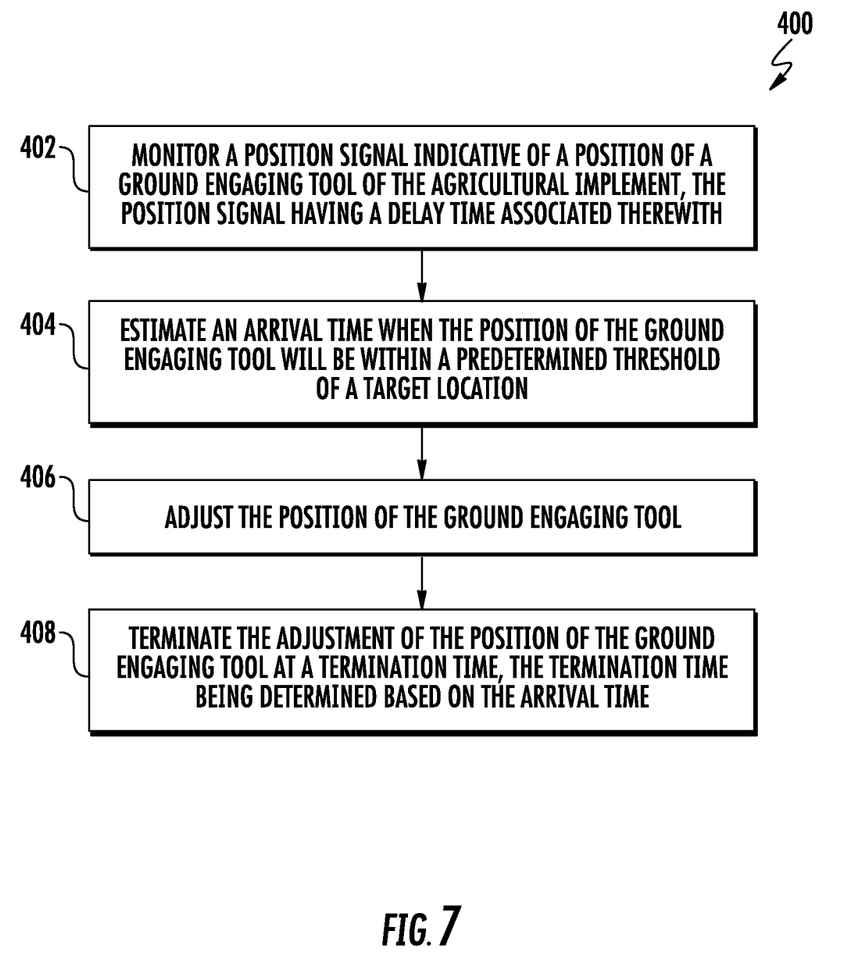
FIG. 7 illustrates a flow diagram of one embodiment of a method for automatically controlling a position of one or more ground engaging tools of an agricultural implement relative to a ground surface in accordance with aspects of the present subject matter.

Referring to FIG. 7, a flow diagram of one embodiment of a method 400 for automatically controlling a position of one or more ground engaging tools of an implement relative to a ground surface is illustrated in accordance with aspects of the present subject matter. In general, the method 400 will be described herein with reference to the implement 10 described above with reference to FIGS. 1-3 and the system 100 described above with reference to FIG. 4. However, it should be appreciated by those of ordinary skill in the art that the disclosed method 200 may generally be utilized to control the position of any suitable ground engaging tools relative to a support structure, such as an implement frame, cultivator, harvester, and/or the like. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 7, the method 400 may include, at (402), monitoring a position signal indicative of a position of a ground engaging tool of the implement. As indicated above, the position signal may have a delay time associated therewith. For example, as discussed above, in some embodiments, the system delay time may include a controller response delay between the implement controller 102 transmitting the adjustment signals 124 and the vehicle controller 104 responding to the adjustment signals 124, as discussed above with reference to FIG. 4.

The method 400 may include, at (404), estimating an arrival time when the position of the ground engaging tool will be within a predetermined threshold of a target position. For example, in some embodiments, the estimation may be based on the monitored position signal and associated delay time. For instance, in some embodiments, because of a system delay time associated with the system 100 the ground engaging tool may not immediately stop moving upon a command to do so. Instead, for the first time period, the implement position (and monitored position signal) may remain substantially unchanged. After the delay time has passed, the implement position (and monitored position signal) may begin changing during a second time period. The implement controller 102 may be configured to estimate the arrival time based on a portion of the position signal 122 during the second time period. For example, the implement controller 102 may be configured to calculate an average velocity of the ground engaging tool based on the position signal. The system 100 (e.g., the implement controller 102, the vehicle controller 104, or a controller that is distinct from each of the implement controller 102 and vehicle controller 104) may be configured to calculate the arrival time by assuming that the ground engaging tool will continue to move at the average velocity for the system delay time. As indicated above, in other embodiments, more complicated projection algorithms may be used, for example, based on experimental data, the response characteristics of the hydraulic system, and/or the like.

The method 400 may include, at (406), adjusting the position of the ground engaging tool. For example, in some embodiments, the control system 100 may calculate an error signal based on a comparison between the monitored position of the ground engaging tool and a target position. The position of the ground engaging tool may be adjusted based on the error signal. In other embodiments, however, the control system may adjust the position of the ground engaging tool using any suitable method (e.g., closed-loop PI, closed-loop PID, open-loop, etc.)

The method 400 may include, at (408), terminating the adjustment of the position of the ground engaging tool at a termination time based on the arrival time. For example, the control system 100 may attempt to cease active adjustment of the position of the ground engaging tool before the ground engaging tool actually reaches the target position so that once the system delay time passes and the control system 100 actually stops adjusting the position of the ground engaging tool towards the target position, the position of the ground engaging tool is within the predetermined threshold of the target position. For example, the output command signal of the control system 100 may rapidly drop starting at the termination time. For instance, the output command signal my decrease to zero between the termination time and the arrival time. In some embodiments, the control system 100 may select the termination time based on the arrival time such that once the system delay time passes and the control system 100 actually stops adjusting the position of the ground engaging tool, the ground engaging tool is within the predetermined threshold of the target position. In other embodiments, the termination time may be earlier than in the previous example to additionally account for the momentum of the ground engaging tool and/or the associated support structure (e.g., the implement frame 20) such that the momentum carries the tool to within the predetermined threshold of the target position after the control system 100 actually stops adjusting the position of the ground engaging tool. In some embodiments, the implement controller 102 may instruct the vehicle controller 104 to stop adjusting the position of the ground engaging tool using the valve(s) 116. In some embodiments, the control system 100 may not actively adjust the position of the ground engaging tool for a predetermined time period (e.g., until $t_{arrival}$ or until the delay time has passed). Then the control system 100 may resume controlling the position of the ground engaging tool using any suitable method such a closed control loop, e.g., PI or PID control loop.

Figure 8:
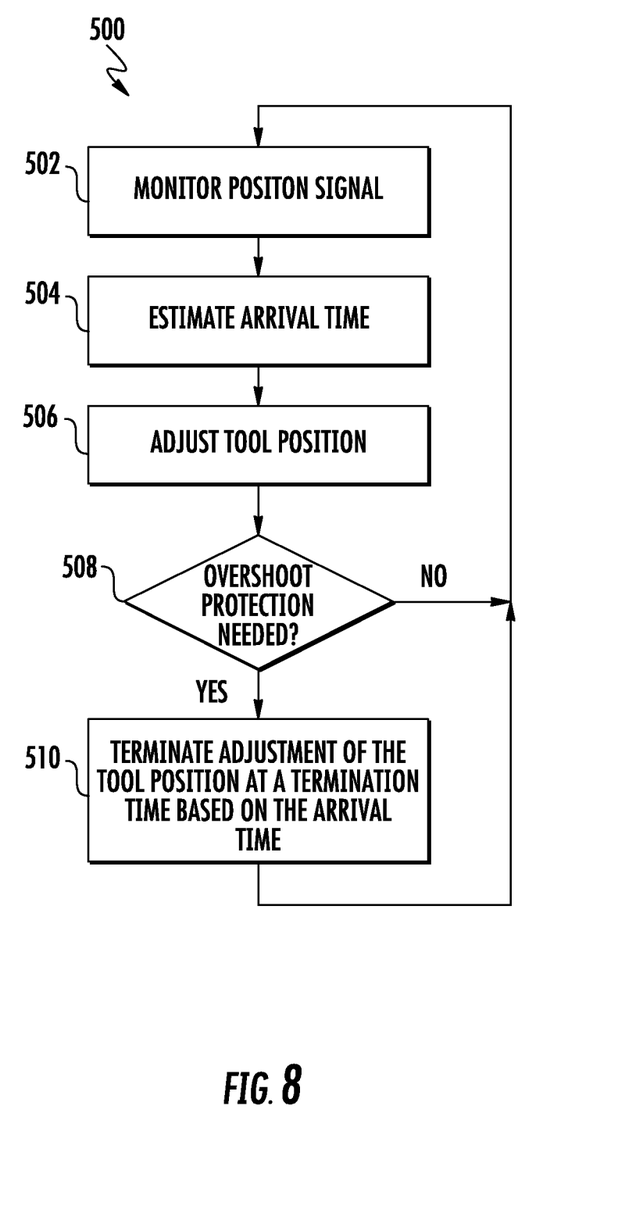
FIG. 8 illustrates a flow diagram of a control algorithm representing a specific implementation of one embodiment of a method for automatically controlling a position of one or more ground engaging tools of an agricultural implement relative to a ground surface in accordance with aspects of the present subject matter.

Referring to FIG. 8, a flow diagram of another embodiment of a method 500 for automatically controlling a position of one or more ground engaging tools of an implement relative to a ground surface is illustrated in accordance with aspects of the present subject matter. In general, the method 500 will be described herein with reference to the implement 10 described above with reference to FIGS. 1-3 and the system 100 described above with reference to FIG. 4. However, it should be appreciated by those of ordinary skill in the art that the disclosed method 500 may generally be utilized to control the position of any suitable ground engaging tools relative to a support structure, such as an implement frame, cultivator, harvester, and/or the like. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

The method 500 may include, at (502), may include monitoring a position signal indicative of a position of a ground engaging tool, for example as explained with reference to FIG. 7.

The method 500 may include, at (504), estimating an arrival time when the position of the ground engaging tool will be within a predetermined threshold of a target position, for example as explained above with reference to FIG. 7.

The method 500 may include, at (506), adjusting the position of the ground engaging tool, for example as explained above with reference to FIG. 7.

The method 500 may include, at (508), predicting whether overshoot protection is needed. For example, the control system 100 may predict whether the ground engaging tool, absent preventative action, would overshoot the target position and/or an upper bound of a predetermined threshold 214 of the target position value 208. For example, in some embodiments, the control system 100 may compare the arrival time with the system delay time associated with the position signal. In some embodiments, the control system 100 may compare the average velocity of the ground engaging tool (e.g., during the second time period 212 explained with reference to FIG. 5B) to the system delay time. In some embodiments, the control system 100 may determine if overshoot protection is needed based on at least one of the system delay time, the mass of the ground engaging tool and/or support structure, response characteristics of the hydraulic system, or response characteristics of the control system 100.

The method 500 may include at (510), when it is determined that overshoot protection is needed, terminating, with the one or more computing devices, adjustment of the position of the ground engaging tool at a termination time. For example, the control system 100 may stop actively controlling the position of the ground engaging tool at the termination time. As discussed above, the termination time may be based on the arrival time. In some embodiments, the termination time may be before the arrival time to compensate for the momentum of the ground engaging tool and/or support structure.

In some embodiments, the control system 100 may not resume actively adjusting the position of the ground engaging tool unless the position of the ground engaging tool exceeds a predetermined error band about the target position. In some embodiments, the predetermined error band may be the same as the predetermined threshold 214 discussed above with reference to FIG. 5B. In other embodiments, however, the predetermined error band may be different than the predetermined threshold 214. For example, the predetermined error band may be larger (e.g., encompass a greater range of positions) than the predetermined threshold 214. Additionally, the predetermined error band may be symmetric or asymmetric about the target position.

In other embodiments, the control system 100 may not resume actively adjusting the position of the ground engaging tool for a predetermined time period (e.g., until $t_{arrival}$ or until the delay time has passed). After the predetermined time period has passed, the control system 100 may, at (502)-(506), resume controlling the position of the ground engaging tool using any suitable method such a closed control loop, e.g., PI or PID control loop, etc.

In other embodiments, however, the method 500 may include multiple control loops and terminating adjusting the tool position at the termination time may include stopping one or more of the multiple control loops. In other embodiments, at (510), in some embodiments, the control system 100 may continue to make minor adjustments to the tool position.

If, at (508), the control system 100 determines that the position of the ground engaging tool will not overshoot (or that the probability of such an overshoot is below the probability predetermined threshold), the method 500 may return to monitoring the position signal, at (502).

Although generally described with regard to a single control loop, it should be understood that the system and methods disclosed herein could be implemented with multiple control loops. For example, a fine tuning PI or PID control loop may continuously adjust the position of the ground engaging tool, even immediately after the control system, at (510), stops adjusting the position of the ground engaging tool. In other words, terminating the adjustment of the position of the ground engaging tool may include stopping one control loop (but not necessarily all control loops) configured to adjust the position of the ground engaging tool.

In some embodiments, multiple control loops may be selectively engaged and disengaged. For example, in other embodiments, the control system 100 may be configured to implement a first control loop to adjust the position of the ground engaging tool. The control system 100 may also be configured to detect when the error signal exceeds a predetermined limit. When it is detected that the error signal exceeds the predetermined limit, the control system 100 may engage a second control loop configured to rapidly adjust the position of the ground engaging tool towards the target position such that the error signal is reduced. In such an embodiment, terminating adjusting the tool position, at (510), may include terminating the second control loop but not the first control loop. In such an embodiment, the first control loop may continue to make minor adjustments to the position of the ground engaging tool. Thus, in some embodiments, the disclosed methods and systems may be used to selectively engage and disengage a second control loop configured to quickly adjust the position of the ground engaging tool to the target position. In some embodiments, the second control loop may be configured as an open-loop system, for example.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically controlling a position of one or more ground engaging tools of an agricultural implement relative to a ground surface, the method comprising:
   monitoring, with one or more computing devices, a position signal indicative of a position of a ground engaging tool of the agricultural implement, the position signal having a system delay time associated therewith;
   calculating an error signal based on a comparison between the monitored position of the ground engaging tool and a target position;
   estimating, with the one or more computing devices, an arrival time when the error signal will be within a predetermined error threshold based on the monitored position signal and the system delay time associated with the monitored position signal;
   adjusting, with the one or more computing devices, the position of the ground engaging tool based on the error signal;
   terminating, with the one or more computing devices, adjustment of the position of the ground engaging tool at a termination time and until at least one of a predetermined time period following the termination time has passed or the error signal exceeds a predetermined error band, the termination time being determined based on the arrival time; and
   resuming adjusting the position of the ground engaging tool only after the at least one of the predetermined time period has passed or the error signal has exceeded the predetermined error band.

2. The method of claim 1, further comprising calculating the termination time based, at least in part, on a tool momentum parameter associated with at least one of the ground engaging tool or a support structure to which the ground engaging tool is attached.

3. The method of claim 2, further comprising:
   computing the tool momentum parameter based on a rate of change of the monitored position signal and a mass of at least one of the ground engaging tool or the support structure to which the ground engaging tool is attached.

4. The method of claim 1, wherein estimating the arrival time includes calculating an average velocity of the ground engaging tool.

5. The method of claim 1, further comprising:
   comparing the arrival time with the system delay time; and
   predicting whether an overshoot event will occur based on the comparison of the arrival time and the system delay time.

6. The method of claim 1, wherein terminating the adjustment of the position of the ground engaging tool at the termination time includes stopping at least one control loop configured to adjust the position of the ground engaging tool.

7. A position control system for controlling a position of one or more ground engaging tools of an agricultural implement, the system comprising:
   a support structure;
   a ground engaging tool coupled to the support structure;
   a tool position sensor configured to generate position signals indicative of a position of the ground engaging tool; and
   at least one controller communicatively coupled to the tool position sensor, the at least one controller including a processor and associated memory, the memory storing instructions that, when executed by the processor, configure the at least one controller to:
   monitor the position signals received from the tool position sensor, the position signals having a system delay time associated therewith;

calculate an error signal based on a comparison between the monitored position of the ground engaging tool and a target position;

estimate an arrival time when the error signal will be within a predetermined error threshold based on the monitored position signal and the system delay time associated with the monitored position signal;

adjust the position of the ground engaging tool based on the error signal; and terminate the adjustment of the position of the ground engaging tool at a termination time and until at least one of a predetermined time period following the termination time has passed or the error signal exceeds a predetermined error band, the termination time being determined based on the arrival time; and resume adjusting the position of the ground engaging tool only after the at least one of the predetermined time period has passed or the error signal has exceeded the predetermined error band.

8. The system of claim 7, wherein the at least one controller is further configured to calculate the termination time based, at least in part, on a tool momentum parameter associated with at least one of the ground engaging tool or the support structure.

9. The system of claim 8, wherein the at least one controller is further configured to compute the tool momentum parameter based on a rate of change of the monitored position signal and a mass of at least one of the ground engaging tool or the support structure.

10. The system of claim 7, wherein the at least one controller is further configured to calculate an average velocity of the ground engaging tool to estimate the arrival time.

11. The system of claim 7, wherein the at least one controller is further configured to:

compare the arrival time with the system delay time associated with the position signal; and predict whether an overshoot event will occur based on the comparison of the arrival time and the system delay time.

12. The system of claim 7, wherein the at least one controller is further configured to:

compute a tool momentum parameter based on a rate of change of the monitored position of the ground engaging tool and a mass of at least one of the ground engaging tool or a support structure to which the ground engaging tool is attached; and calculate the termination time based, at least in part, on the tool momentum parameter.

13. The system of claim 7, wherein the at least one controller comprises a vehicle controller and an implement controller, and wherein the system delay time associated with the position signals is associated with at least one of a communication delay between the vehicle controller and the implement controller, a hydraulic delay in a hydraulic system associated with adjusting the position of the ground engaging tool, or a response delay in the at least one controller.

14. A method for automatically controlling a position of one or more ground engaging tools of an agricultural implement relative to a ground surface, the method comprising:

monitoring, with one or more computing devices, a position signal indicative of a position of a ground engaging tool of the agricultural implement, the position signal having a system delay time associated therewith;

calculating an error signal based on a comparison between the monitored position of the ground engaging tool and a target position;

estimating, with the one or more computing devices, an arrival time when the error signal will be within a predetermined error threshold;

adjusting, with the one or more computing devices, the position of the ground engaging tool based on the error signal;

determining, with the one or more computing devices, if the position of the ground engaging tool will overshoot at least one of the target position or an upper bound of the predetermined threshold of the target position;

when it is determined that the position of the ground engaging tool will overshoot at least one of the target position or an upper bound of the predetermined threshold of the target position, terminating, with the one or more computing devices, the adjustment of the position of the ground engaging tool at a termination time, the termination time being based on the arrival time; and resuming adjusting the position of the ground engaging tool only after the at least one of the predetermined time period has passed or the error signal has exceeded the predetermined error band.

\* \* \* \* \*